US008341817B2

(12) United States Patent
Chung (10) Patent No.: US 8,341,817 B2
(45) Date of Patent: Jan. 1, 2013

(54) DISASSEMBLING TOOL HAVING TWO CAMS

(75) Inventor: Yu-Sheng Chung, Changhua (TW)

(73) Assignee: Trans-Chief Co., Ltd., Hemei Township, Changhua County (TW)

( * ) Notice: Subject to any disclaimer, the term of this patent is extended or adjusted under 35 U.S.C. 154(b) by 311 days.

(21) Appl. No.: 12/838,488

(22) Filed: Jul. 18, 2010

(65) Prior Publication Data
US 2012/0011689 A1  Jan. 19, 2012

(51) Int. Cl.
 *B23P 19/04* (2006.01)
 *B25B 1/00* (2006.01)
(52) U.S. Cl. .............................. 29/244; 29/267; 269/229
(58) Field of Classification Search ............ 29/244, 29/25, 256, 267, 278, 280, 33; 269/3, 6, 269/95, 228, 229, 231
 See application file for complete search history.

(56) References Cited

U.S. PATENT DOCUMENTS

| 1,004,260 | A | * | 9/1911 | Higbee | 269/228 |
| 1,655,641 | A | * | 1/1928 | Altfather | 29/237 |
| 2,291,795 | A | * | 8/1942 | Colt | 294/86.4 |
| 2,562,419 | A | * | 7/1951 | Ferris | 29/243.519 |
| 2,744,312 | A | * | 5/1956 | Conger | 29/256 |
| 3,877,689 | A | * | 4/1975 | Todd | 269/32 |
| 4,031,603 | A | * | 6/1977 | Shultz | 29/426.6 |
| 6,449,823 | B2 | * | 9/2002 | Krapp | 29/244 |
| RE43,348 | E | * | 5/2012 | Qualman et al. | 29/213.1 |

* cited by examiner

*Primary Examiner* — Brian Glessner
*Assistant Examiner* — Joseph J Sadlon (57) ABSTRACT

An disassembling tool having at least two cams has a bolt having a connecting knob at one end and a threaded section formed at another end, the connecting knob having a first through aperture, a nut screwed onto the threaded section; a tightening cap covering the connecting knob and comprising two second through apertures corresponding to the first through aperture; an axel having a head portion and another end disposed through the first through aperture and the second through apertures, a round shaft formed at a middle section of the axel axel and coaxially pivoted with the first through aperture, a first control section and a second control section having an eccentric shape formed on two ends of the round shaft, and the first and second control sections respectively and synchronously driving the second through apertures; and a control handle used to control rotational movement of the axel.

8 Claims, 9 Drawing Sheets

DISASSEMBLING TOOL HAVING TWO CAMS

BACKGROUND OF THE INVENTION

1. Field of the Invention

The present invention relates to a disassembling tool, and more particularly to a disassembling tool having two cams, which has an axel utilizing a first control section and a second control section to move a tightening cap secured onto a connecting knob, such that the tightening cap generates movement relative to a bolt.

2. Description of the Related Art

Figure 9:
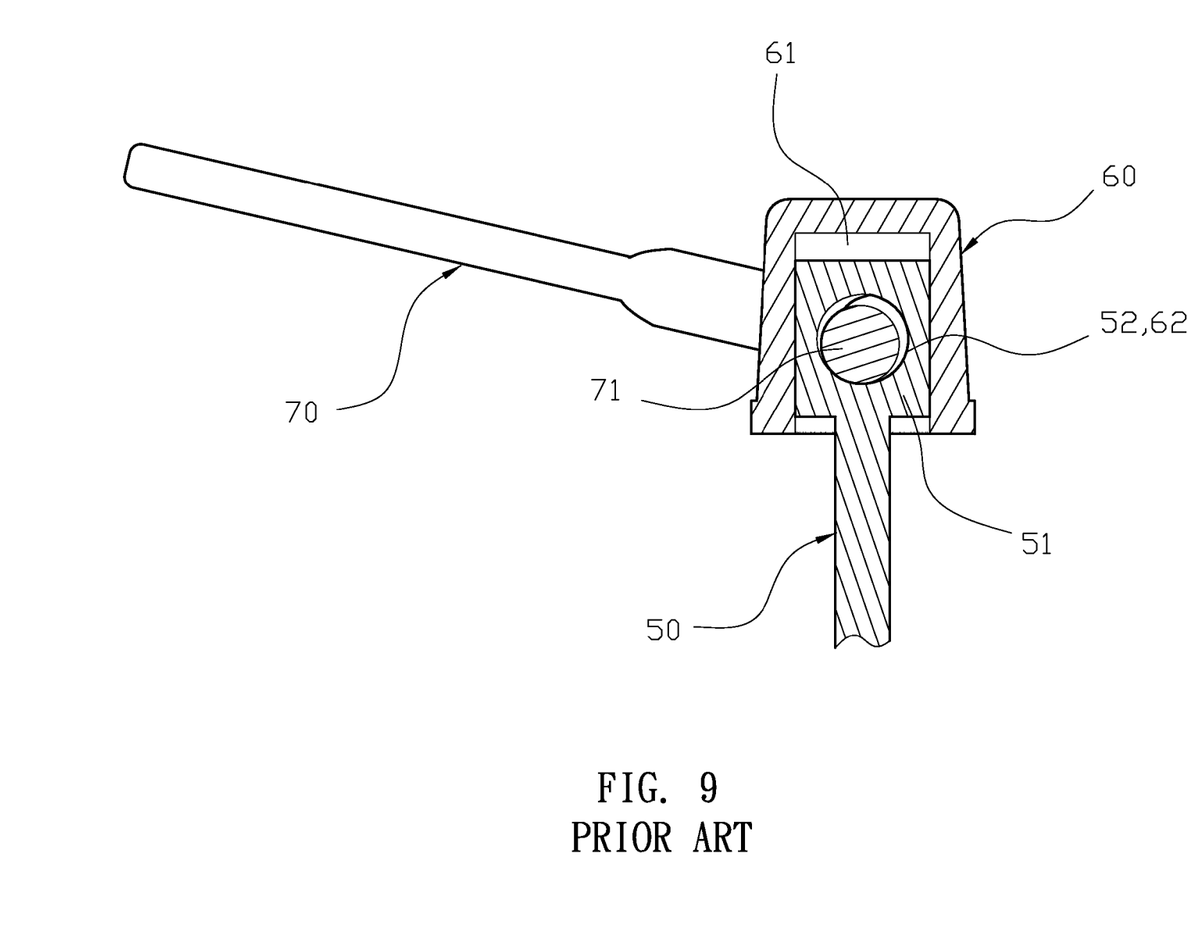
FIG. 9 is a cross-section view of a prior art device while being unscrewed.
Figure 10:
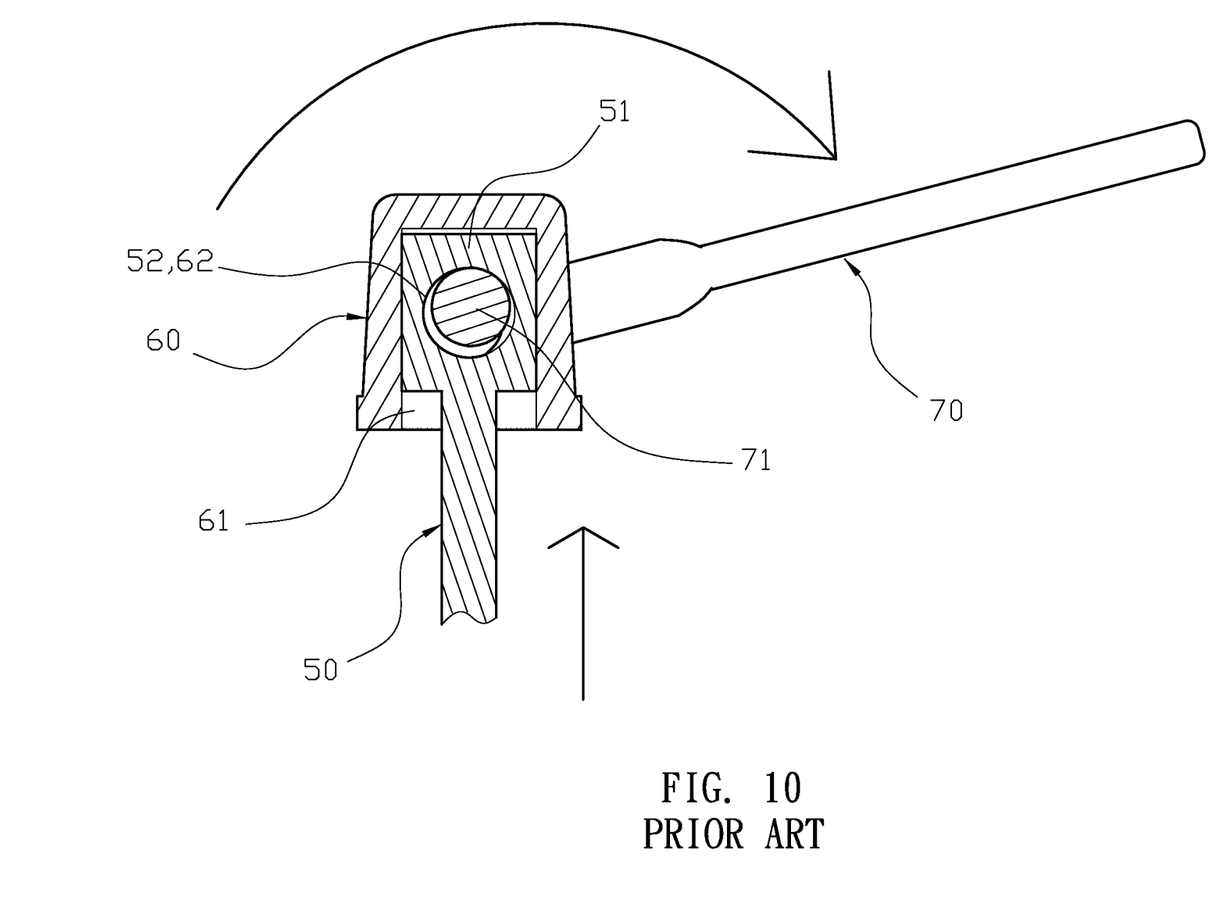
FIG. 10 is a cross-section view of the prior art while being screwed.

Currently, a prior art disassembling tool, with reference to FIGS. 9 and 10, comprises a long bolt 50 having a head portion 51 a through aperture 52 disposed through the head portion 51; a cap 60 having a containment space 61 capable of accepting the head portion 51 of the bolt 50 and a first through aperture 62 corresponding to the through aperture 52 of the bolt 50; and a handle 70 having an eccentric column 71 at one end and the eccentric column 71 passing through the first through aperture 62 of the cap 60 and through aperture 52 of the bolt 50 and being pivotally secured. Only an eccentric portion of the column 71 is placed into the through aperture 52 of the bolt 50. When the disassembling tool needs to be tightened, the handle 70 is rotated around the column 71 and the eccentric column 71 is rotated in the through aperture 52 of the head portion 51. When the eccentric portion of the column 71 pushes against the through aperture 52 to cause the bolt 50 to move towards the cap 60 such that the head portion 51 moves up within the containment space 61 of the cap 60.

However, the prior art tool has a significant problem. The eccentric column 71 of the handle 70 drives the bolt 50 of the through aperture 52 of the head portion 51 to move the entire bolt 50 towards the cap 60, with the bolt 50 being placed into an object that needs to be secured. When the tool is operated to perform a tightening process, the bolt 50 generates greater resistance that makes it difficult to turn the handle.

Therefore, it is desirable to provide a disassembling tool having at least two cams to mitigate and/or obviate the aforementioned problems.

SUMMARY OF THE INVENTION

An objective of the present invention is to provide disassembling tool having at least two cams, which generatex two torques, which can reduce the strength required for turning the control handle 40.

In order to achieve the above-mentioned objective, the disassembling tool of the present invention comprises a bolt, a tightening cap, an axel and a control handle. The bolt has a connecting knob at one end and a threaded section formed at another end. The connecting knob has a first through aperture through opposing side walls, and a nut is screwed onto the threaded section. Furthermore, the bolt has an elastic element respectively mounted adjacent to the connecting knob and the nut, and each elastic element has a tapered shape. The tightening cap covers the connecting knob and comprises two second through apertures on opposing side walls corresponding to the first through aperture of the connecting knob. The second through apertures of the tightening cap are larger than the first through aperture of the connecting knob, and a flat stopping face is respectively formed on one side of the second through apertures. The axel has a head portion and another end disposed through the first through aperture and the second through apertures, a round shaft is formed at a middle section of the axel and coaxially pivoted with the first through aperture. A first control section and a second control section, each having an eccentric shape, are formed on two ends of the round shaft, and the first and second control sections respectively and synchronously drive the second through apertures of the tightening cap. The control handle is coupled to the axel and is used to control rotational movement of the axel. The control handle is attached to the first control section of the axel. An eccentric cam is disposed onto the first control section at the second through aperture of the tightening cap, and the second control section and the eccentric cam form a symmetrical eccentric object. The first control section has an axially raised positioning strip, and the control handle and the eccentric cam both have a positioning groove corresponding to the positioning strip such that the positioning strip and the positioning grooves are integrated together. Moreover, external surfaces of the head portion and the control handle comprise ornamental covers.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
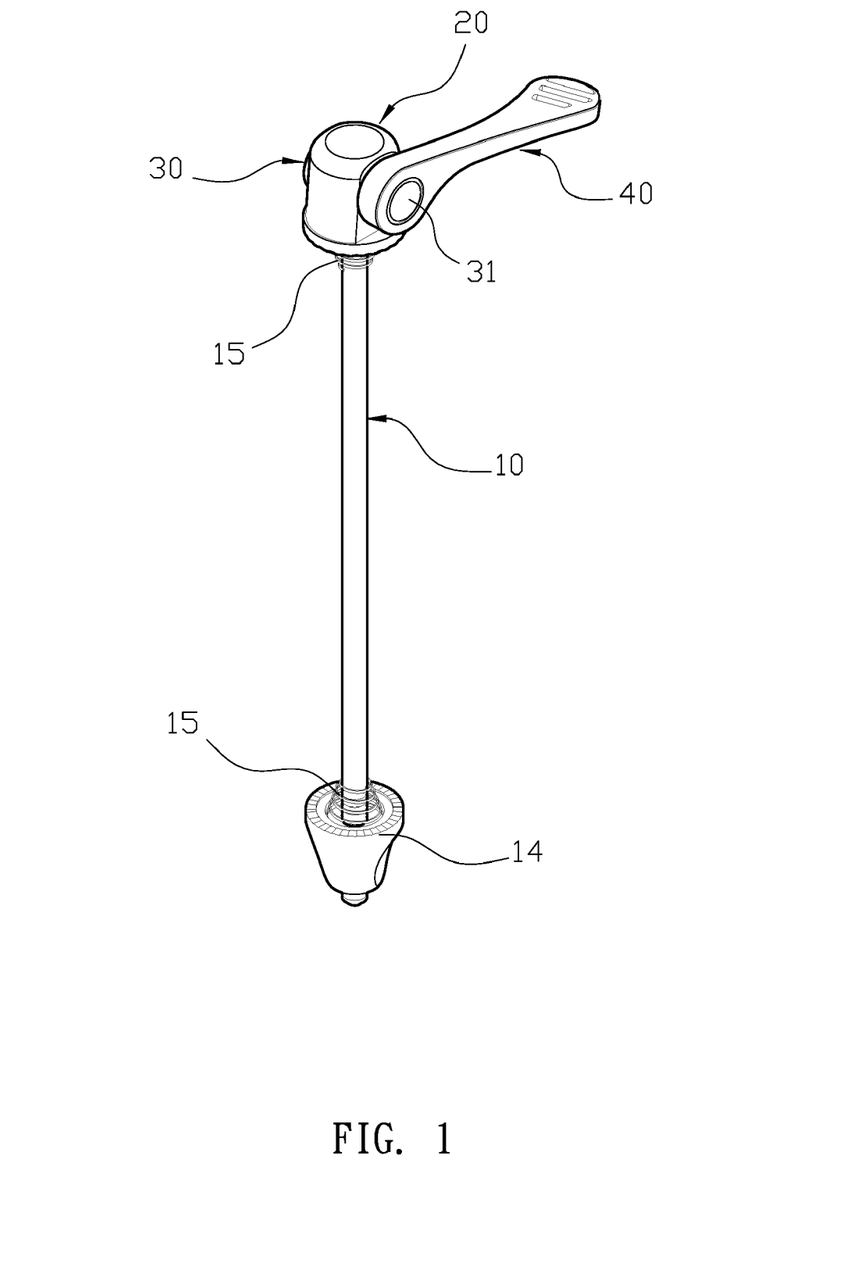
FIG. 1 is a perspective view of an embodiment of the present invention.
Figure 2:
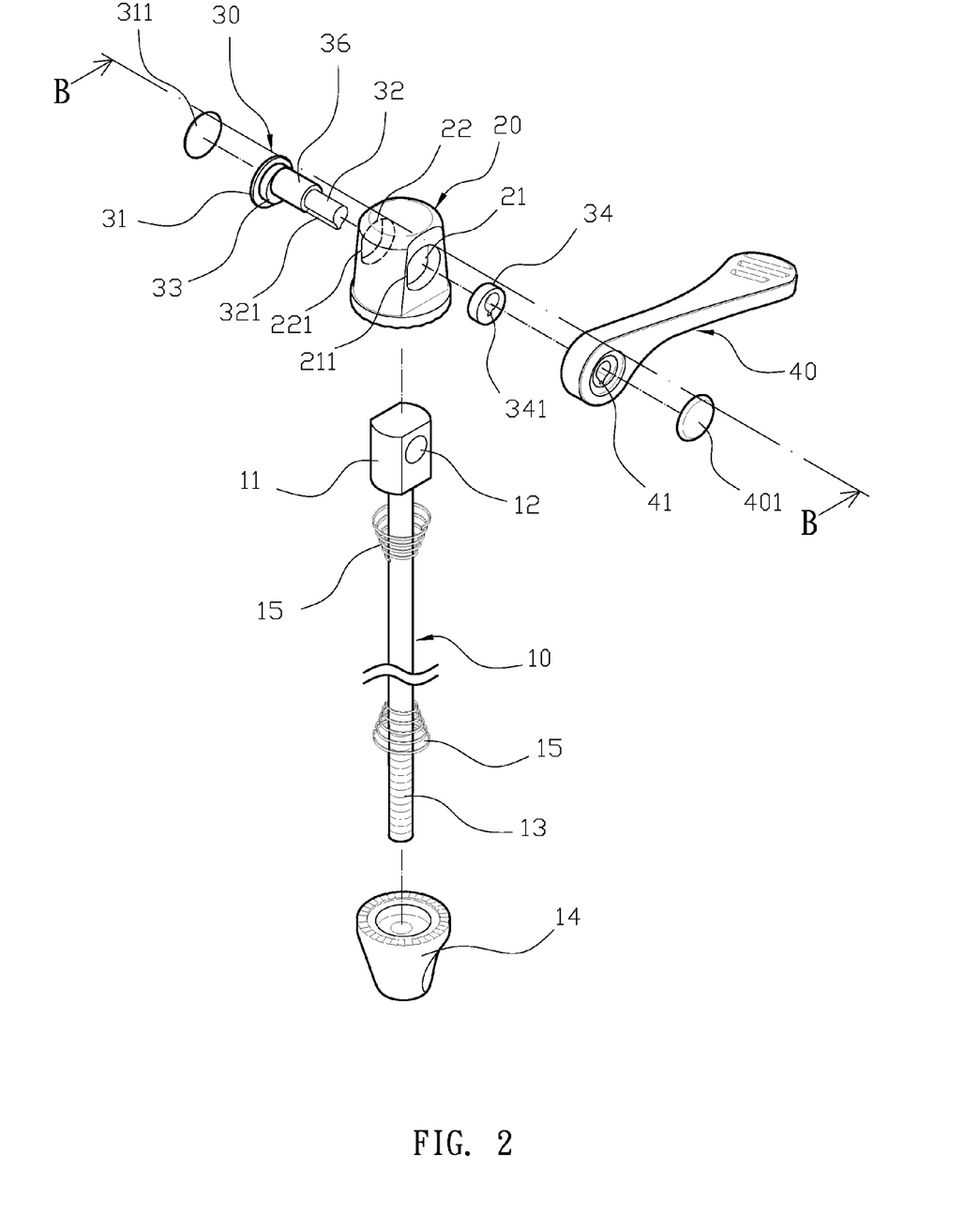
FIG. 2 is a perspective exploded view of an embodiment of the present invention.

Please refer to FIG. 1 and FIG. 2. A disassembling tool having at least two cams comprises a bolt 10, a tightening cap 20, an axel 30 and a control handle 40. The bolt 10 has a connecting knob 11 at one end and a threaded section 13 formed at another end. The connecting knob 11 has a first through aperture 12 through opposing side walls, and a nut 14 is screwed onto the threaded section 13. Furthermore, the bolt 10 has an elastic element 15 respectively mounted adjacent to the connecting knob 11 and the nut 14, and each elastic element 15 has a tapered shape. The tightening cap 20 covers the connecting knob 11 and comprises two second through apertures 21, 22 on opposing side walls corresponding to the first through aperture 12 of the connecting knob 11. The second through apertures 21, 22 of the tightening cap 20 are larger than the first through aperture 12 of the connecting knob 11, and a flat stopping face 211, 221 is respectively formed on one side of the second through apertures 21, 22.

The axel 30 has a head portion 31 and another end disposed through the first through aperture 12 and the second through apertures 21, 22; a round shaft 36 is formed at a middle section of the axel 30 and coaxially pivoted with the first through aperture 12. A first control section 32 and a second control section 33, each having an eccentric shape, are formed on two ends of the round shaft 36, and the first and second control sections 32, 33 respectively and synchronously drive the second through apertures 21, 22 of the tightening cap 20. The control handle 40 is coupled to the axel 30 and is used to control rotational movement of the axel 30. The control handle 40 is attached to the first control section 32 of the axel 30. An eccentric cam 34 is disposed onto the first control section 32 at the second through aperture 21 of the tightening cap 20, and the second control section 33 and the eccentric cam 34 form a symmetrical eccentric object. The first control section 32 has an axially raised positioning strip 321, and the control handle 40 and the eccentric cam 34 both have a positioning groove 41, 341 corresponding to the positioning strip 321 such that the positioning strip 321 and the positioning grooves 41, 341 are integrated together. Moreover, external surfaces of the head portion 31 and the control handle 41 comprise ornamental covers 311, 401.

Figure 3:
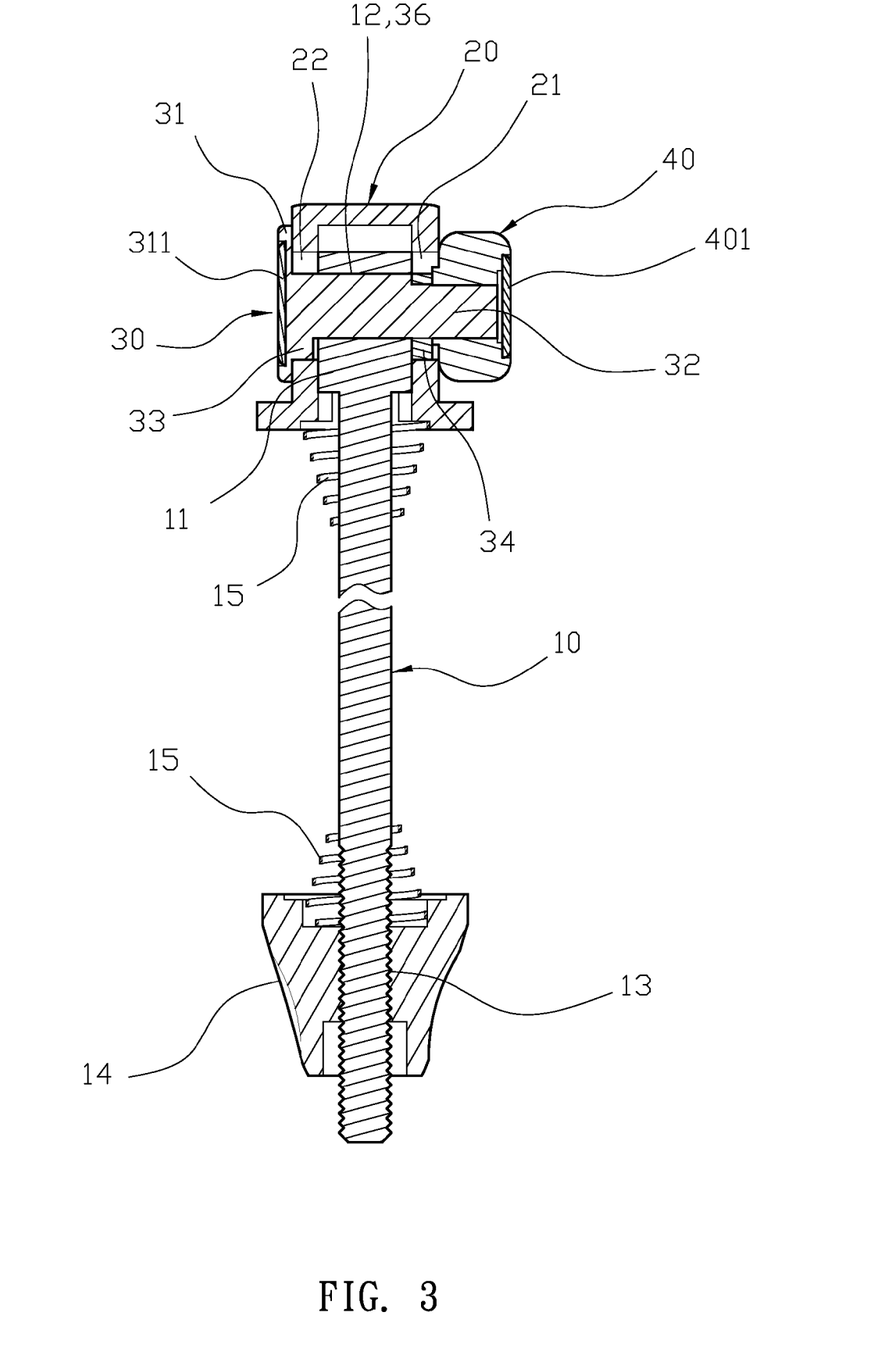
FIG. 3 is a cross-section view of an embodiment of the present invention.

For assembly, please refer to FIG. 2 and FIG. 3. The nut 14 is secured onto the threaded section 13 of the bolt 10, and the connecting knob 11 is covered with the tightening cap 20 such that the second through apertures 21, 22 of the tightening cap 20 are aligned with the first through aperture 12 of the connecting knob 11. Furthermore, the first control section 32 of the axel 30 is sequentially placed through the second through aperture 22, the first through aperture 12 and the second through aperture 21, and the head portion 31 of the axel 30 is used as a stop. Therefore, the round shaft 36 of the axel 30 is coaxially pivoted with the first through aperture 12 of the connecting knob 11, and the second control section 33 is eccentrically placed in the second through aperture 22. The eccentric cam 34 is jacketed onto the first control section 32, and the control handle 40 is jacketed onto the first control section 32 protruding from the eccentric cam 34. The positioning strip 321 of the first control section 32 engages with the eccentric cam 34 and the positioning groove 341 of the control handle 40, such that the eccentric cam 34 and the second control section 33 form a symmetrical eccentric object. Last, the ornamental covers 311, 401 are respectively placed onto the head portion 31 and the control handle 40 such that the axel 30 is not capable of exiting from the second through apertures 21, 22 and the first through aperture 12, and the connecting knob 11 is limited in the tightening cap 20.

Figure 4:
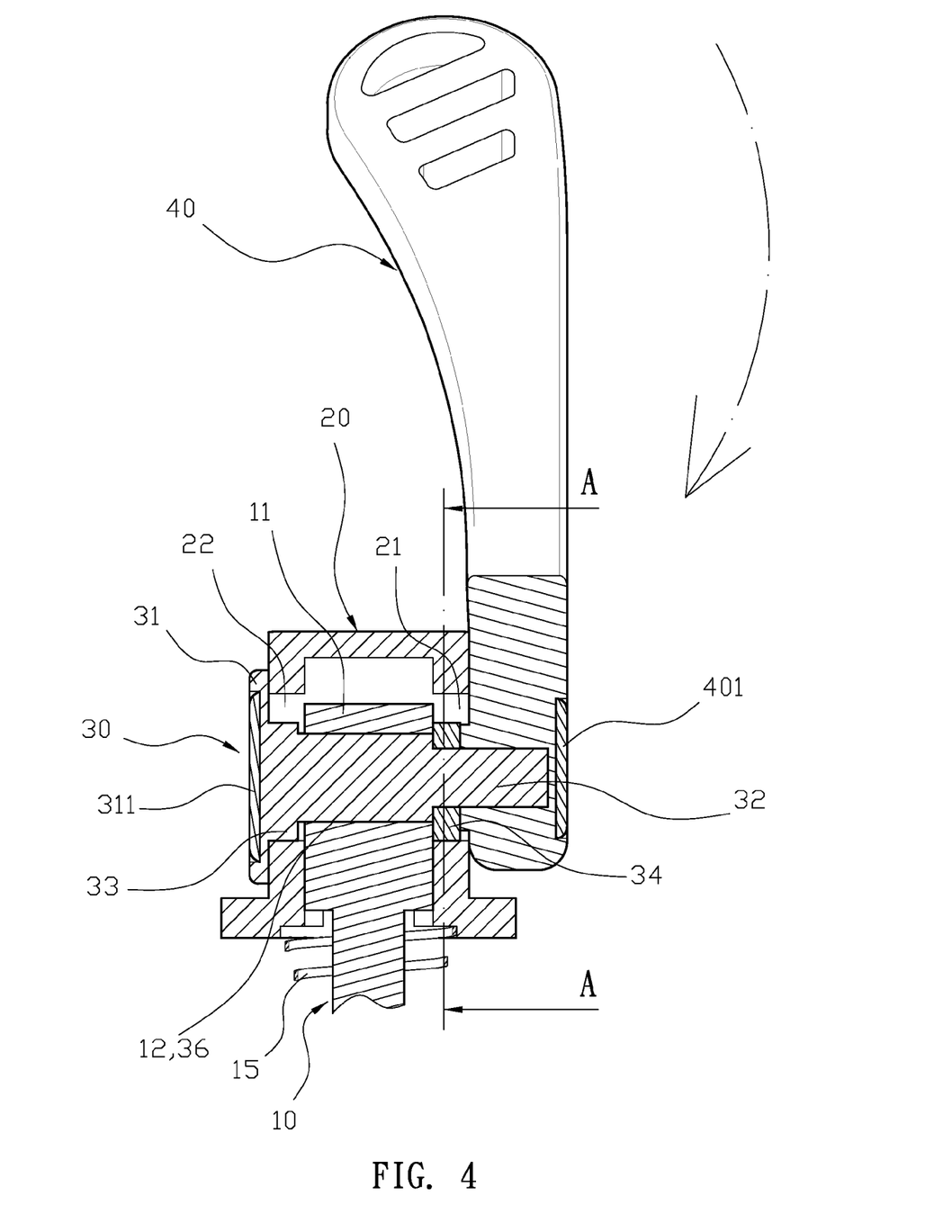
FIG. 4 is a cross-section view of an unscrewed connecting knob according to an embodiment of the present invention.
Figure 5:
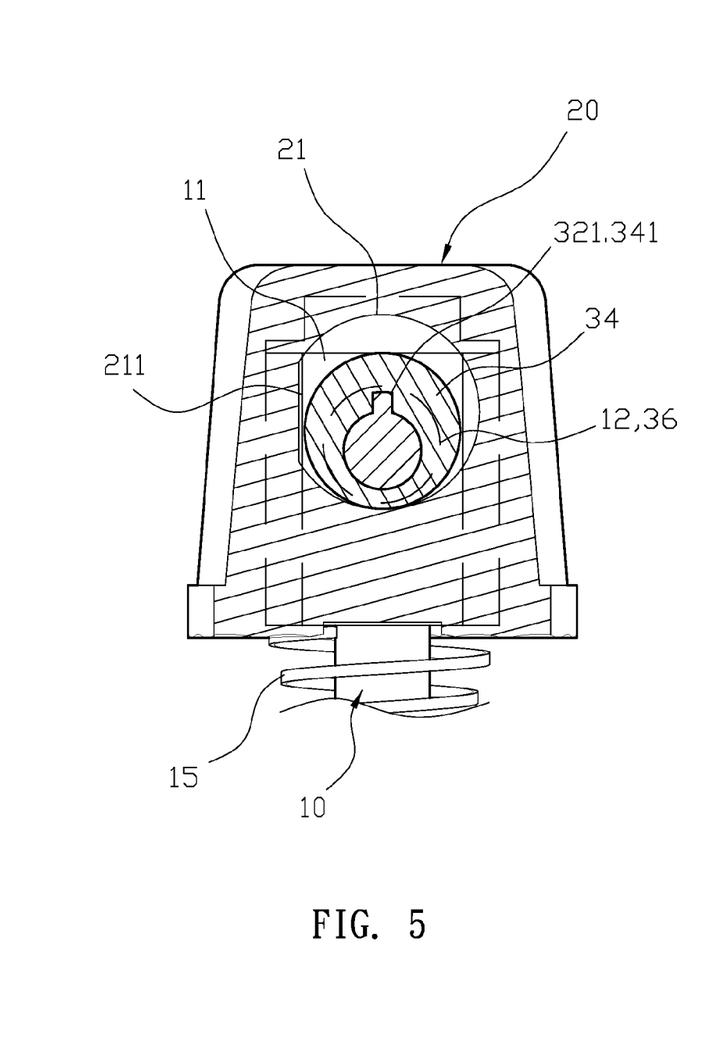
FIG. 5 is a cross-sectional view along a line A-A of an embodiment of the present invention while being unscrewed.
Figure 6:
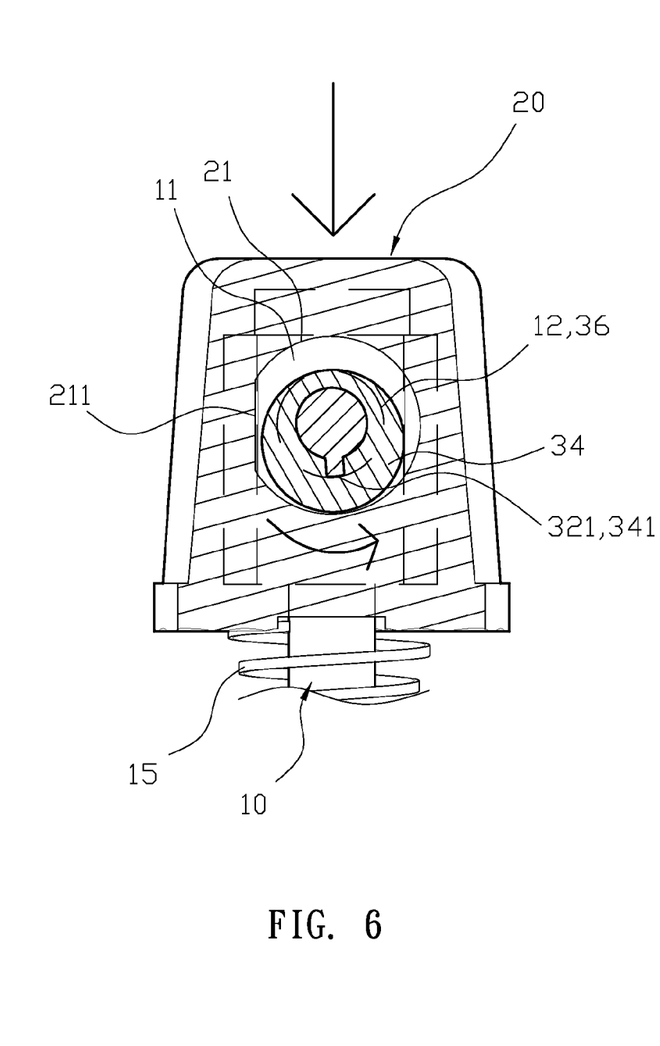
FIG. 6 is a cross-section view along the line A-A of an embodiment of the present invention while being screwed.

For operations, please refer to FIGS. 4, 5 and 2. The bolt 10 can be used for disassembling parts on a bicycle. The nut 14 of the thread section 13 forms one tightening end; when the dissembling tool is not in use, the elastic element 15 pushes the tightening cap 20 up from its inner side such that the tightening cap 20 moves away from the connecting knob 11, and the first control section 32 of the axel 30, the eccentric cam 34 and the second control section 33 are pushed by the second through apertures 21, 22 of the tightening cap 20 and closer to another side of the stopping faces 211, 221 in the second through apertures 21, 22, such that the control handle 40 is loosened. Please refer to FIG. 6. In order to perform a disassembly process, the control handle 40 is turned to rotate towards another side of the stopping faces 211, 221; the axel 30 is driven by the control handle 40 to simultaneously rotate and drive the eccentric cam 34 and the second control section 33 to generate a deflection. Furthermore, the eccentric cam 34 and the second control section 33 respectively push the inner walls of the second through aperture 21, 22 of the tightening cap 20, and the axel 30 utilizes the round shaft 36 as a pivot for the first through aperture 12 of the connecting knob 11. Therefore, when the tightening cap 20 is pushed closer to the connecting knob 11 and compresses the elastic element 15, the eccentric cam 34 and the second control section 33 are stopped by the stopping faces 211, 221 of the second through aperture 21, 22. With the outer edges of the eccentric cam 34 and the second control section 33 pushing against the stopping faces 211, 221, the tightening cap 20 is tightened and locked. With the above-described movement, by controlling the displacement of the tightening cap 20, the disassembly tool can provide the desired tightening torque.

Figure 7:
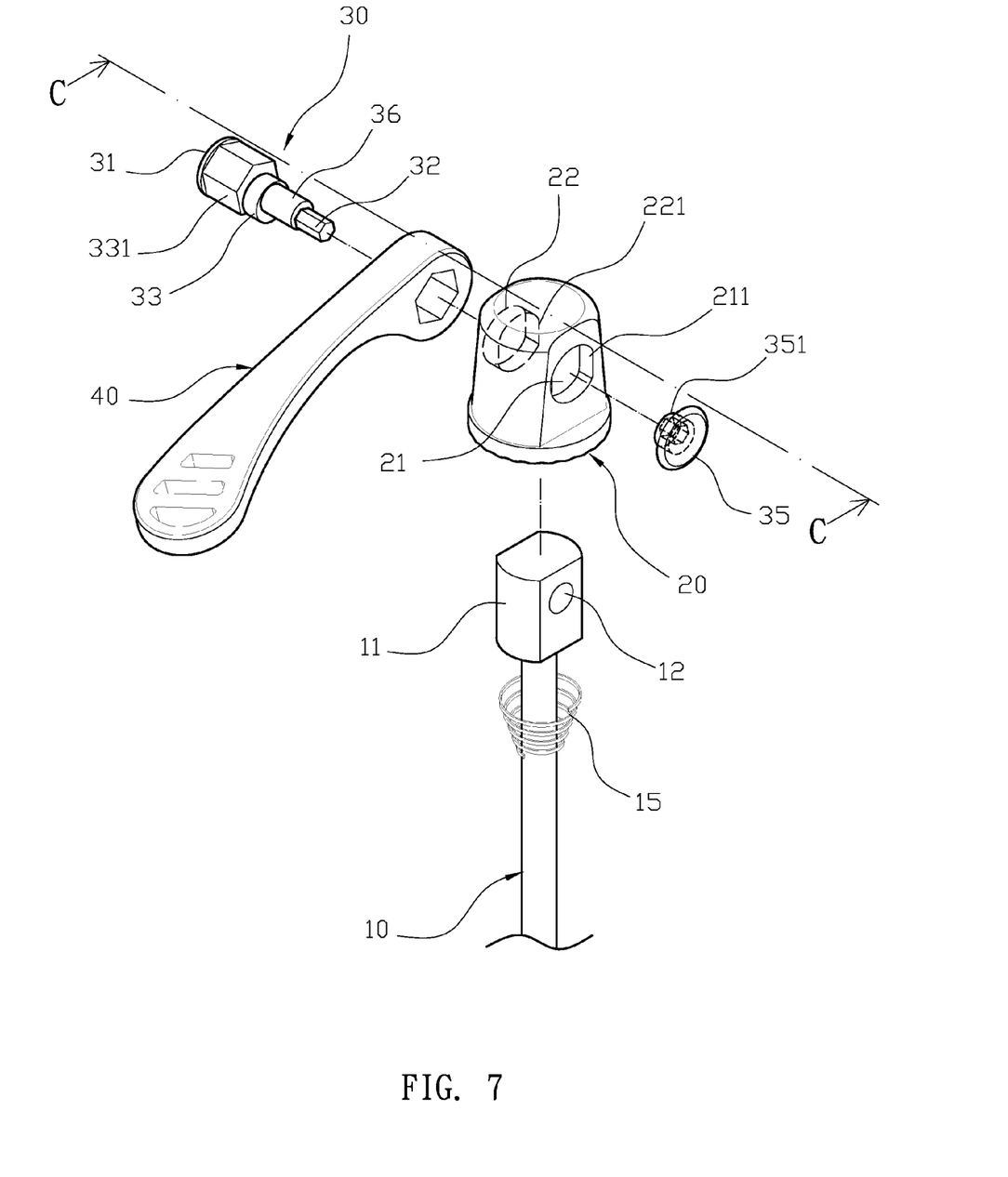
FIG. 7 is a perspective view of another embodiment of the present invention.
Figure 8:
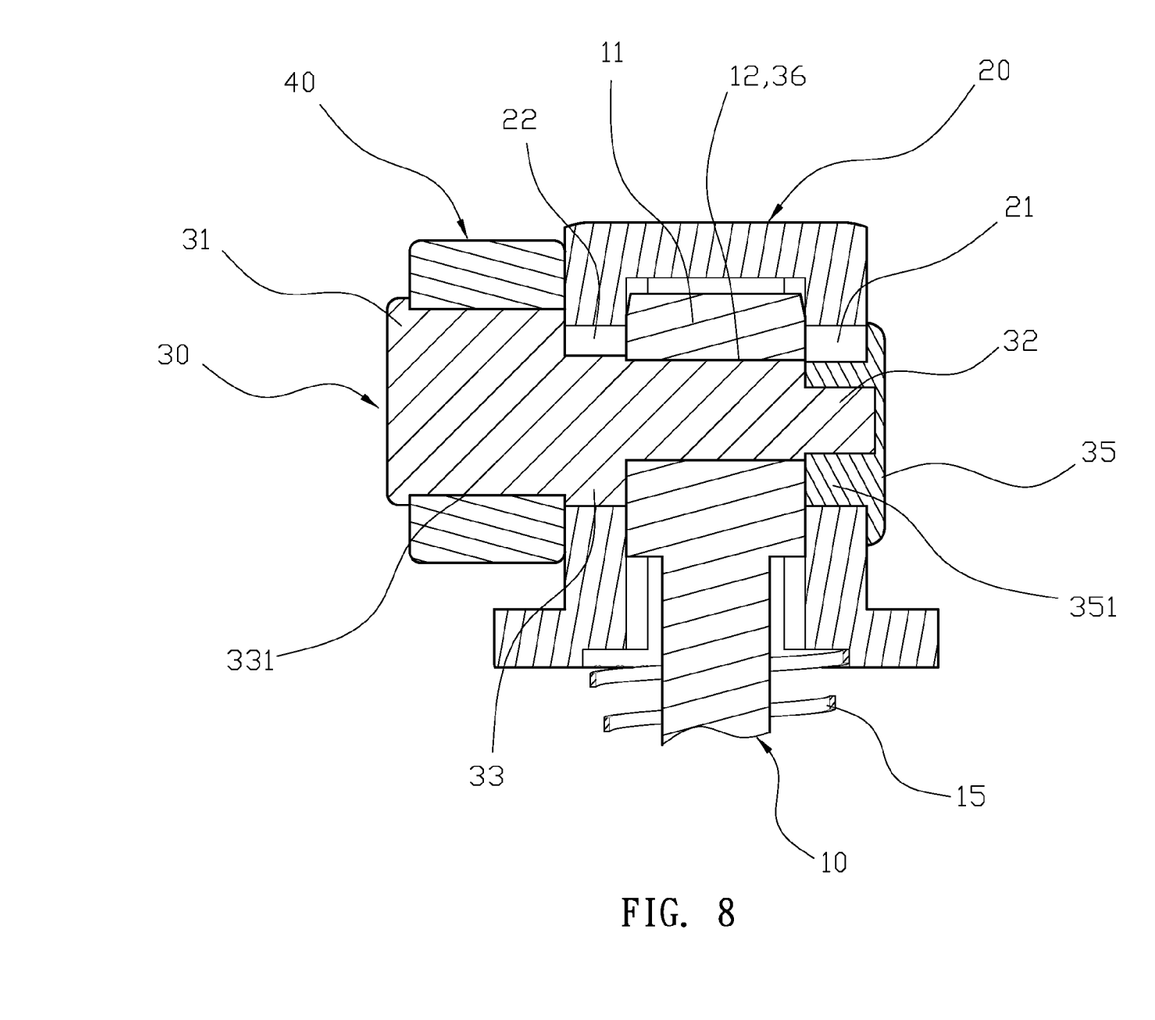
FIG. 8 is a perspective exploded view of another embodiment of the present invention.

For another embodiment of the present invention, please refer to FIGS. 7, 8 and 2. A disassembling tool having at least two cams comprises a bolt 10, a tightening cap 20, an axel 30 and a control handle 40. The bolt 10 has a connecting knob 11 at one end and a threaded section 13 formed at another end. The connecting knob 11 has a first through aperture 12 through opposing side walls, and a nut 14 is screwed onto the threaded section 13. The tightening cap 20 covers the connecting knob 11 and comprises two second through apertures 21, 22 in opposing side walls corresponding to the first through aperture 12 of the connecting knob 11. The axel 30 has a head portion 31 and another end disposed through the first through aperture 12 and the second through apertures 21, 22; a round shaft 36 is formed at a middle section of the axel 30 and coaxially pivoted with the first through aperture 12. A first control section 32 and a second control section 33 having an eccentric shape are formed on two ends of the round shaft 36, and the first and second control sections 32, 33 respectively and synchronously drive the second through apertures 21, 22 of the tightening cap 20. The control handle 40 is coupled to the axel 30 and is used to control rotational movement of the axel 30. The second control section 33 of the axel 30 has a hex assembly portion 331 adjacent to the head portion 31, and the control handle 40 is mounted onto the assembly portion 331. A securing cap 35 is mounted onto the first control section 32, and the securing cap 35 has an eccentric section 351 corresponding to the second through aperture 21, such that the second control section 33 and the eccentric section 351 of the securing cap 35 form an eccentric object. The first control section 32 and the assembly portion 331 of the second control section 33 both comprise a hexagonal body, and the securing cap 35 and the control handle 40 both have a corresponding hexagonal shape to be combined together.

For assembly, please also refer to FIG. 7 and FIG. 8. The bolt 10 has an elastic element 15 respectively mounted adjacent to the connecting knob 11 and the thread section 13, and nut 14 is screwed onto the threaded section 13. The connecting knob 11 is covered with the tightening cap 20 such that the second through apertures 21, 22 of the tightening cap 20 are aligned with the first through aperture 12 of the connecting knob 11. The axel 30 is first jacketed with the control handle 40, and then the control handle 40 is attached onto the assembly portion 331. Afterwards, the first control section 32 of the axel 30 is placed through the second through apertures 21, 22 such that the axel 30 passes through the connecting knob 11 and the tightening cap 20 together and sandwiches the control handle 40. Last, the securing cap 35 is mounted onto the end of the first control section 32 of the second through aperture 21, and the eccentric section 351 of the securing cap 35 is placed in the second through aperture 21. In order to perform a disassembly process, the control handle 40 is turned to rotate the axel 30 at the assembly portion 331 of the second control section 33; while the axel 30 is rotating, eccentric rotations of the second control section 33 and the eccentric section 351 are also generated, and a displacement of the tightening cap 20 is generated by pushing against the second through apertures 21, 22, to provide a tightening effect.

With the above-mentioned embodiments, the following benefits can be obtained: the axel 30 is coaxially pivoted with the bolt 10; the axel 30 generates an eccentric rotation of the first control section 32 and the second control section 33 to push the tightening cap 20 covering the connecting knob 11. Therefore, the tightening cap 20 can provide tightening and loosening movements to the bolt 10. With the two cams of the disassembling tool, the tightening cap 20 is driven by two torques, which can reduce the strength required for turning the control handle 40.

Although the present invention has been explained in relation to its preferred embodiment, it is to be understood that many other possible modifications and variations can be made without departing from the spirit and scope of the invention as hereinafter claimed.

What is claimed is:

1. A disassembling tool having at least two cams comprising:
    a bolt having a connecting knob at one end and a threaded section formed at another end, the connecting knob having a first through aperture through opposing side walls, a nut screwed onto the threaded section;
    a tightening cap covering the connecting knob and comprising two second through apertures in opposing side walls corresponding to the first through aperture of the connecting knob;
    an axle having a head portion and another end disposed through the first through aperture and the second through apertures, a round shaft formed at a middle section of the axle and coaxially pivoted with the first through aperture, a first control section and a second control section having an eccentric shape formed on two ends of the round shaft, and the first and second control sections respectively and synchronously driving the second through apertures of the tightening cap; and
    a control handle coupled to the axle and used to control rotational movement of the axle.

2. The disassembling as claimed in claim 1, wherein the bolt has an elastic element respectively mounted adjacent to the connecting knob and the nut, each elastic element having a tapered shape.

3. The disassembling tool as claimed in claim 1, wherein the second through apertures of the tightening cap are larger than the first through aperture of the connecting knob, and a stopping edge is respectively formed on one side of the second through apertures.

4. The disassembling tool as claimed in claim 1, wherein the control handle is attached to the first control section of the axle, an eccentric cam is disposed onto the first control section at the second through aperture of the tightening cap, and the second control section and the eccentric cam form a symmetrical eccentric object.

5. The disassembling tool as claimed in claim 4, wherein the first control section has an axially raised positioning strip, and the control handle and the eccentric cam both have a positioning groove corresponding to the positioning strip such that the positioning strip and the positioning groove are integrated.

6. The disassembling tool as claimed in claim 4, wherein external surfaces of the head portion and the control handle comprise ornamental covers.

7. The disassembling tool as claimed in claim 1, wherein the second control section of the axle has a hex assembly portion adjacent to the head portion, the control handle is mounted onto the assembly portion, a securing cap is mounted onto the first control section, and the securing cap has an eccentric section corresponding to the second through aperture, such that the second control section and the eccentric section of the securing cap form an eccentric object.

8. The disassembling tool as claimed in claim 7, wherein the first control section and the assembly portion of the second control section both comprise a hexagonal body, and the securing cap and the control handle both have a corresponding hexagonal shape to be combined together.

* * * * *